United States Patent
Garland et al.

(10) Patent No.: US 10,830,335 B2
(45) Date of Patent: Nov. 10, 2020

(54) LOW PROFILE GEARBOX WITH SECONDARY SUMP

(71) Applicant: CNH Industrial America LLC, New Holland, PA (US)

(72) Inventors: Dan L. Garland, Solon, IA (US); Matthew Flannery, Stevens, PA (US); Nathaniel Smith, Lancaster, PA (US); Nicholas J. Laufenberg, Glen Ellyn, IL (US); Herbert M. Farley, Elizabethtown, PA (US); Thamilselvan Karuppannan, Moline, IL (US)

(73) Assignee: CNH Industrial America LLC, New Holland, PA (US)

( * ) Notice: Subject to any disclaimer, the term of this patent is extended or adjusted under 35 U.S.C. 154(b) by 441 days.

(21) Appl. No.: 15/843,606

(22) Filed: Dec. 15, 2017

(65) Prior Publication Data
US 2019/0186619 A1  Jun. 20, 2019

(51) Int. Cl.
*A01D 69/00* (2006.01)
*F16H 57/04* (2010.01)
(Continued)

(52) U.S. Cl.
CPC .......... *F16H 57/045* (2013.01); *A01D 41/142* (2013.01); *A01D 69/03* (2013.01); *A01D 69/06* (2013.01); *F16H 57/02* (2013.01); *F16H 57/0416* (2013.01); *F16H 57/0423* (2013.01); *F16H 57/0424* (2013.01);
(Continued)

(58) Field of Classification Search
CPC ...... A01D 41/142; A01D 69/03; A01D 69/06; A01D 69/12; F16H 57/0419; F16H 57/0447; F16H 57/0457; F16H 57/045; F16H 57/0495; F16H 57/02;
(Continued)

(56) References Cited

U.S. PATENT DOCUMENTS 4,630,711 A  12/1986 Levrai et al.
7,059,443 B2  6/2006 Kira
(Continued)

FOREIGN PATENT DOCUMENTS

EP  0067639 A2  12/1982
EP  2995188 A1  3/2016

OTHER PUBLICATIONS

Extended European Search Report for EP Application No. 18203259.9 dated Mar. 20, 2019 (7 pages).

*Primary Examiner* — Robert E Pezzuto
(74) *Attorney, Agent, or Firm* — Peter Zacharias; Patrick Sheldrake

(57) ABSTRACT

An agricultural vehicle including a frame, a prime mover supported by the frame, and a header connected to the frame. The header includes at least one drive line, at least one transmission, at least one rotating cross shaft, and at least one gearbox operably connected to the at least one rotating cross shaft. The at least one gearbox includes a housing connected to the header and configured for housing a working fluid. The housing has an inlet, an outlet, and an end. The at least one gearbox also includes a gear train housed within the housing and an auxiliary sump connected to the end of the housing and fluidly coupled to the inlet and the outlet of the housing such that the working fluid circulates through the housing and the auxiliary sump.

10 Claims, 3 Drawing Sheets

(51) Int. Cl.
    *F16H 57/02*  (2012.01)
    *A01D 69/06*  (2006.01)
    *A01D 69/03*  (2006.01)
    *A01D 41/14*  (2006.01)
    *A01D 45/02*  (2006.01)

(52) U.S. Cl.
    CPC ..... *F16H 57/0457* (2013.01); *F16H 57/0495* (2013.01); *A01D 45/02* (2013.01); *A01D 69/002* (2013.01); *F16H 2057/02056* (2013.01)

(58) Field of Classification Search
    CPC ............. F16H 57/0416; F16H 57/0423; F16H 57/0424; F16N 7/28
    USPC .... 56/10.1, 10.7, 13.6, 14.6; 74/467, 606 R; 180/6.12, 65.6, 243; 184/6.12, 11.1, 11.2, 184/13.1
    See application file for complete search history.

(56) References Cited

U.S. PATENT DOCUMENTS

| | | | |
|---|---|---|---|
| 7,954,309 B2* | 6/2011 | Ehrhart | A01D 34/665 |
| | | | 56/13.6 |
| 8,356,695 B2 | 1/2013 | Scuffham et al. | |
| 8,899,381 B2 | 12/2014 | Ebihara et al. | |
| 9,897,192 B2* | 2/2018 | Tahara | F16H 57/0457 |
| 2010/0180721 A1 | 7/2010 | Quehenberger | |
| 2011/0192245 A1* | 8/2011 | Shioiri | F16H 57/0423 |
| | | | 74/467 |
| 2016/0192589 A1* | 7/2016 | Foster | A01D 41/12 |
| | | | 56/10.7 |
| 2016/0341124 A1 | 11/2016 | Ross et al. | |

* cited by examiner

LOW PROFILE GEARBOX WITH SECONDARY SUMP

FIELD OF THE INVENTION

The present invention pertains to agricultural vehicles and, more specifically, to agricultural vehicles which include a header with a gearbox.

BACKGROUND OF THE INVENTION

Work vehicles, including agricultural vehicles such as combines, windrowers, or tractors, can include a power shaft for operably translating power from a prime mover, e.g. an engine, to a driven component. Agricultural vehicles can include a power shaft that is operably coupled to a header to drive the working components of the header. Typical headers may include one or more cutter bar(s) for removing the crop material from a field, stalk rollers, choppers, gathering chains, a conveyor for transporting the crop material to the feeder housing, and/or a reel.

In regard to harvesting corn, a header known as a "corn head" generally includes snouts, row units, a conveyor, and accompanying drive architecture to power the header. The snouts are conically shaped to pass in between the rows of corn, defining a designated passageway for the rows of corn to travel therein. The row units generally include gathering chains and stalk rolls, positioned beneath the gathering chains. Each row unit also includes respective gear boxes to drive the gathering chains and stalk rolls. Generally, the respective gear boxes are all driven by a single rotating cross shaft, which in turn is driven by the drives located at each lateral end of the header. A drive shaft, powered by the power take off (PTO) of the agricultural vehicle, generally extends outwardly across the rear of the header to connect to the drives at the lateral ends of the corn header. The conveyor is disposed aft of the row units and it may be in the form of a conveyor belt, an auger with a tubular shaft having left and right flighting, or a combination of both. As the agricultural vehicle traverses the field, the corn stalks are pulled inwardly by the gathering chains and downwardly by the stalk rolls. This motion causes the ears of corn to forcefully hit the base of the header and thereby snap off their respective stalk. The gathering chains additionally help to move the ears of corn inwardly toward the conveyor, which transports the ears of corn to the center of the header for entry into the feeder house. The stripped corn stalks are further pinched and crushed by the stalk rolls in order to accelerate the decomposition process of the stalks. The header may also include chopping units that have reciprocating blades located beneath the stalk rolls to chop the stalks, leaves, and other debris (also known as material other than grain "MOG") to more easily incorporate the remaining residue in subsequent tillage practices. Each chopping unit may respectively be driven by gear boxes, which are all driven by an additional rotating cross shaft that is operably coupled to the power shaft of the agricultural vehicle.

Gearboxes in a header usually operate in strict vertical space constraints, especially chopper gearboxes which drive the chopping units beneath the row units. Due to such design constraints, conventional gearboxes may have a limited oil capacity and thereby an inefficient cooling system to remove heat from within the gearboxes. The suboptimal heat dissipation can cause a substantial reduction of the life of the oil and/or the operational life of the gearbox. This may cause increased operational cost as an operator may need to more frequently change the oil in the gearboxes and/or replace the gearbox entirely.

It is known to cool a motor using lubricating oil which was splashed from an oil sump by a driven gear and stored in an oil storage chamber. U.S. Pat. No. 7,059,443 to Kira discloses a rear wheel driving unit for a hybrid vehicle that includes an oil catch tank and a slinger oil storage chamber, which are each located within the casing and respectively store splashed oil from an oil sump by a driven gear of the differential. To cool the motor, the oil is supplied from the oil catch tank to an oil passage in a main shaft leading to the inside of a motor shaft by gravitational force. As shown in FIG. 5, the oil catch tank is positioned above the slinger chamber, and the oil splashed from the slinger chamber by the slinger is supplied to the oil passage to effectively cool the motor using the lubricating oil from the differential.

What is needed in the art is a gearbox which can efficiently dissipate heat when operating in a vertically constrained space.

SUMMARY OF THE INVENTION

In one exemplary embodiment provided in accordance with the present invention, an agricultural vehicle has a header and a gearbox. The gearbox has a housing, a gear train within the housing, and an auxiliary sump fluidly connected to the end of the housing. The auxiliary sump is external to the housing and provides additional fluid and additional exterior surface area which increases the cooling efficiency of the gearbox.

In another exemplary embodiment provided in accordance with the present invention, an agricultural vehicle includes a frame, a prime mover supported by the frame, and a header connected to the frame. The header includes at least one drive line operably connected to the prime mover and driven by the prime mover. The header also includes at least one transmission operably coupled to the at least one drive line, at least one rotating cross shaft operably coupled to the at least one transmission, and at least one gearbox operably connected to the at least one rotating cross shaft. The at least one gearbox includes a housing connected to the header and configured for housing a working fluid. The housing has an inlet, an outlet, and an end. The at least one gearbox also includes a gear train housed within the housing and an auxiliary sump connected to the end of the housing and fluidly coupled to the inlet and the outlet of the housing such that the working fluid circulates through the housing and the auxiliary sump.

In yet another exemplary embodiment provided in accordance with the present invention, there is provided a gearbox for use in a work vehicle. The gearbox includes a housing configured for housing a working fluid. The housing has an inlet, an outlet, and an end. The at least one gearbox also includes a gear train housed within the housing and an auxiliary sump connected to the end of the housing and fluidly coupled to the inlet and the outlet of the housing such that the working fluid circulates through the housing and the auxiliary sump.

An advantage of the exemplary embodiment of the present invention is that the additional oil volume of the auxiliary sump allows the oil change interval to be extended.

Another advantage of the exemplary embodiment of the present invention is that the auxiliary sump increases the cooling surface area of the gearbox and thereby the auxiliary sump maintains the oil within the gearbox at a lower operating temperature, which extends the life of the oil and the life of the gearbox.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
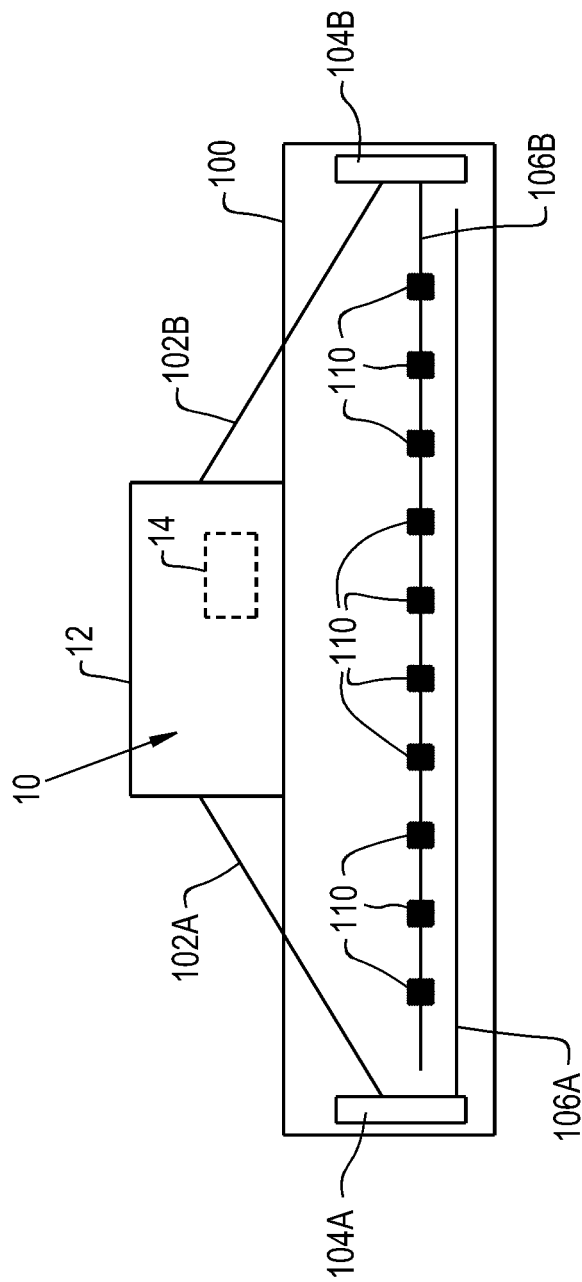
FIG. 1 illustrates a perspective view of an exemplary embodiment of an agricultural vehicle, the agricultural vehicle comprising a header with a gearbox, in accordance with an exemplary embodiment of the present invention.
Figure 2:
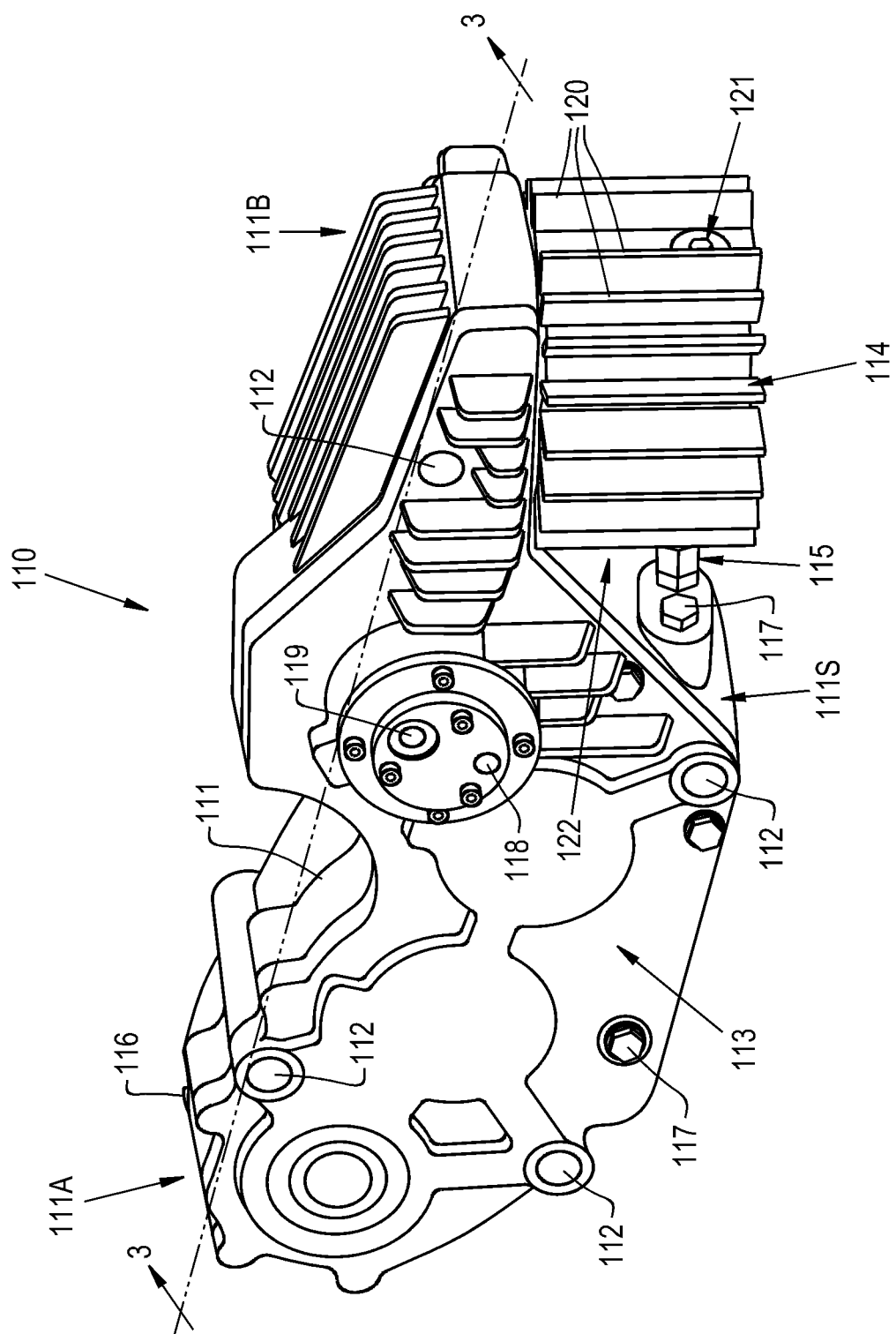
FIG. 2 illustrates the gearbox of the header of FIG. 1, in accordance with an exemplary embodiment of the present invention.
Figure 3:
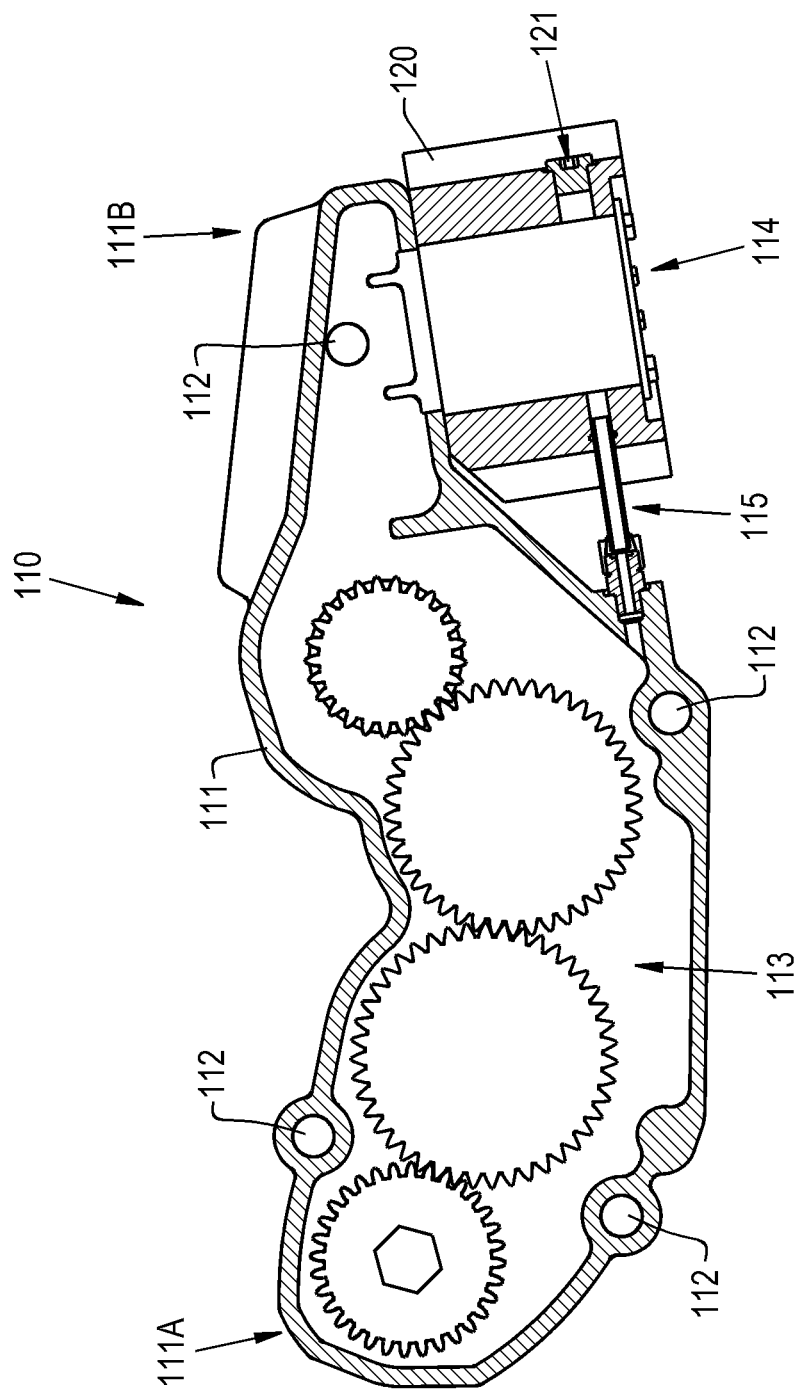
FIG. 3 illustrates a cross-sectional view of the gearbox taken across line 3-3 in FIG. 2, in accordance with an exemplary embodiment of the present invention.

Referring now to FIGS. 1-3, there is shown a work vehicle 10 which has a frame 12, a prime mover 14, e.g. an engine 14, supported by the frame 12, and an attachment 100 connected to the frame 12. The work vehicle 10 may be in form of a construction vehicle, a military vehicle, or an agricultural vehicle. The agricultural vehicle 10 may be in the form of a combine harvester 10.

The attachment 100 may be in the form of a header 100 coupled to the combine harvester 10. The header 100 may be in the form of any desired header 100, such as a corn header 100 which may generally include snouts, row units, choppers, a conveyor, and accompanying drive architecture to power the header 100. For instance, the header 100 may include one or more drive line(s) 102A, 102B, transmission (s) 104A, 104B, rotating cross shaft(s) 106A, 106B, and gearbox(es) 110 for driving each row unit and/or chopping blade of the header 100. The drive line(s) 102A, 102B may be operably coupled to and driven by the prime mover 14 via a respective PTO shaft of the agricultural vehicle 10. The transmission(s) 104A, 104B may be respectively and operably coupled to the drive lines 102A, 102B. The cross shaft(s) 106A, 106B may be operably coupled to the transmission(s) 104A, 104B, respectively. The drive lines 102A, 102B, the transmissions 104A, 104B, and the cross shafts 106A, 106B may respectively drive the row units and choppers of the header 100 in a known manner.

The gearboxes 110 may be operably connected to the rotating cross shaft 106B. In this regard, for example, the gearboxes 110 may be in the form of chopper gearboxes 110 for driving the chopping blades of the header 100. Each gearbox 110 may include a housing 111 connected to the header 100 by way of fasteners (not shown) extending through attachment points 112. Each gearbox 110 may also include a gear train 113 housed within the housing 111 (FIG. 3), an auxiliary sump 114 fluidly connected to the housing 111, and a sump return line 115 fluidly connected in between the auxiliary sump 114 and the housing 111.

The housing 111 may have a front end 111A, a rear end 111B, and an exterior housing surface. The housing 111 may be in the form of a two-part housing 111 which houses the gear train 113. The housing 111 may at least partially be filled with a working fluid, such as oil. The housing 111 may include an outlet and an inlet to fluidly connect the auxiliary sump 114. For instance, the outlet may be located at the bottom surface of the rear end 111B, and the auxiliary sump 114 may be fluidly coupled to the outlet so that the working fluid can travel from the gear train 113 to the auxiliary sump 114. The inlet of the housing may be located near the bottom of the sidewall 111S, and the sump return line 115 may be fluidly coupled to the inlet so that the working fluid can travel back into the housing 111. The housing 111 may additionally include a fill port 116, one or more lube port(s) 117, and a gerotor inlet and outlet 118, 119 for coupling to a gerotor (not shown). The rear end 111B of the housing 111 may extend outwardly such that it forms an extruded, narrow plank portion 111B, which may have an approximately rectangular cross-section. The bottom surface of the extruded end portion 111B may be parallel with the bottom surface of the housing 111. It should be appreciated that the sidewall 111S may be straight or slanted and thereby the rear end 111B, which is adjacent thereto, may extend outwardly at a right or obtuse angle relative to the sidewall 111S of the housing 111. It should also be appreciated that either the front end 111A or the rear end 111B may extend outwardly to form an extruded portion in order to the auxiliary sump 114.

The auxiliary sump 114 may have an exterior sump surface, multiple fins 120, and a drain plug 121. The auxiliary sump 114 may be fluidly connected to the housing 111 such that it increases the overall surface area for efficiently dissipating heat from the oil within the housing 111 and auxiliary sump 114. As shown, a top end of the auxiliary sump 114 is fluidly connected to the inlet of the housing 111 at an underside of the rear end 111B of the housing 111B. In this regard, the auxiliary sump 114 may be in the form of exterior auxiliary sump 114 such that it is mounted on the exterior surface of the housing 111. This allows the auxiliary sump 114 to be located at a distance away from the sidewall 111S of the housing 111, which forms a gap 122 between the sidewall 111S of the housing 111 and the auxiliary sump 114. The gap 122 separates and protects the auxiliary sump 114 from the gear train 113. This allows the full perimeter, e.g. each side, of the auxiliary sump 114 to efficiently release heat. Additionally, the gap 122 allows for increased airflow which further increases the efficiency of the reduction of heat. The auxiliary sump 114 increases the overall oil within the gearbox 110, and the oil level within the auxiliary sump 114 may be higher than the level of oil within the gear train 113. As shown in FIG. 2, the bottom surface of the auxiliary sump 114 may sit above the bottom surface of the housing 111. Additionally, as shown, the auxiliary sump 114 is in the shape of a cylinder 114 extending downwardly and perpendicular to the rear end 111B of the housing 111. The plurality of fins 120 may extend vertically along a length of the cylinder 114. However, the auxiliary sump 114 may be in the form of any shape, for example, a rectangle, a hexagon, etc., and the fins 120 may be of any desired shape and size and may be affixed to the auxiliary sump 114 in any desirable orientation. Further, the housing 111 and/or the auxiliary sump 114 may include additional fins 120 on any or all of its respective surfaces.

The auxiliary sump 114 is configured for being filled with oil by gear splash from the gear train 113 and/or pumping oil from the gear train 113 to the auxiliary sump 114 via a pump disposed in the housing 111 or auxiliary sump 114 (not shown). It should be appreciated that oil may return from the auxiliary sump 114 to the housing 111 by gravity or the pump (not shown). The flow of oil between the area of the gear train 113 and the auxiliary sump 114 may be controlled by various orifice sizes in the return line 115, deflectors on the gear splash, or by a pump displacing oil therebetween. The flow of oil may be fixed or adjustable dependent upon the temperature of the oil. It is conceivable that the auxiliary sump 114 may be a defined area within the housing 111 or may be remotely mounted away from the housing 111 with a fluid line connecting the auxiliary sump 114 and the housing 111.

The sump return line 115 may be fluidly connected to the housing 111 and the auxiliary sump 114 (FIG. 3). More particularly, the sump return line 115 is fluidly connected in between the inlet of the housing 111 and the auxiliary sump 114 such that the working fluid circulates through the housing 111, the auxiliary sump 114, and the sump return line 115. The sump return line 115 may be in the form of an exterior sump return line 115 which has an exterior return line surface. In other words, the sump return line 115 may not be housed within the housing 111 or the auxiliary sump 114. In this regard, the sump return line 115 additionally increases the cooling capacity of the gearbox 110. The sump return line 115 may connect to the lower end of the sidewall 111S of the housing 111 to the lower end of the auxiliary sump 114.

It is noted that the oil storage chambers, as disclosed in U.S. Pat. No. 7,059,443 to Kira, are each positioned within the casing of the rear wheel driving unit, which limits the efficiency of the heat dissipation of the storage chambers. In contrast, the present invention increases airflow around the auxiliary sump 114, creates the requisite space to include the fins 120 around the full perimeter of the auxiliary sump 114, and allows the exterior return line 115 to further dissipate heat. Thereby, the auxiliary sump 114 of the present invention more efficiently dissipates heat than the oil storage chambers as taught by Kira.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
a frame;
a prime mover supported by the frame; and
a header connected to the frame, and including:
at least one drive line operably connected to the prime mover and driven by the prime mover;
at least one transmission operably coupled to said at least one drive line;
at least one rotating cross shaft operably coupled to said at least one transmission; and
at least one gearbox operably connected to said at least one rotating cross shaft, said at least one gearbox including:
a housing connected to the header and configured for housing a working fluid, said housing having an inlet, an outlet, and an end;
a gear train housed within the housing; and
an auxiliary sump connected to the end of the housing and fluidly coupled to the inlet and the outlet of the housing such that the working fluid circulates through the housing and the auxiliary sump.

2. The agricultural vehicle of claim 1, wherein said housing has an exterior housing surface, and said auxiliary sump has an exterior sump surface such that the auxiliary sump is affixed to the exterior housing surface of the housing.

3. The agricultural vehicle of claim 2, wherein said housing further includes a sidewall adjacent to said end of the housing, and said end of the housing extends outwardly such that there is a gap between the sidewall of the housing and the auxiliary sump.

4. The agricultural vehicle of claim 1, wherein said outlet is located at a bottom surface of the end of the housing.

5. The agricultural vehicle of claim 1, further including a sump return line fluidly connected in between the inlet of the housing and the auxiliary sump such that the working fluid circulates through the housing, the auxiliary sump, and the sump return line.

6. The agricultural vehicle of claim 5, wherein said sump return line is an exterior sump return line which has an exterior return line surface.

7. The agricultural vehicle of claim 1, wherein said housing has a bottom surface, and said auxiliary sump has a bottom surface which is positioned above the bottom surface of the housing.

8. The agricultural vehicle of claim 1, wherein said auxiliary sump is configured for being filled with the working fluid by at least one of gear splash from said gear train and pumping the working fluid from the gear train to the auxiliary sump.

9. The agricultural vehicle of claim 1, wherein said at least one gearbox is in the form of a chopper gearbox.

10. The agricultural vehicle of claim 1, wherein said auxiliary sump includes a plurality of fins for dissipating a heat from within the auxiliary sump.

* * * * *